United States Patent [19]

Faghri

[11] Patent Number: 4,976,308
[45] Date of Patent: Dec. 11, 1990

[54] THERMAL ENERGY STORAGE HEAT EXCHANGER

[75] Inventor: Amir Faghri, Dayton, Ohio

[73] Assignee: Wright State University, Dayton, Ohio

[21] Appl. No.: 483,385

[22] Filed: Feb. 21, 1990

[51] Int. Cl.$^5$ .................. F28D 15/02; F28D 20/00
[52] U.S. Cl. ........................................ 165/10; 165/41; 165/104.11; 165/104.14
[58] Field of Search .............. 165/10, 104.11, 104.14, 165/41

[56] References Cited

U.S. PATENT DOCUMENTS

| | | | |
|---|---|---|---|
| 4,131,158 | 12/1978 | Abhat et al. | 165/10 |
| 4,362,207 | 12/1982 | Casali et al. | 165/10 |
| 4,611,474 | 9/1986 | Musinski | 165/104.21 |
| 4,673,030 | 6/1987 | Basiulis . | |
| 4,755,350 | 7/1988 | Kennel . | |
| 4,768,345 | 9/1988 | Kardas | 126/400 |
| 4,809,771 | 3/1989 | Kennel et al. | 165/10 |

Primary Examiner—Albert W. Davis, Jr.
Attorney, Agent, or Firm—Killworth, Gottman, Hagan & Schaeff

[57] ABSTRACT

A modified tube and shell heat exchanger is comprised of a tube of heat sink material having micro heat pipes extending outward into the volume between the tube and shell to enable the rapid and efficient transfer and storage of thermal energy into the heat sink from a liquid or gas circulated through the volume. Several embodiments of the invention include modifications to the heat pipes. An alternative embodiment reverses the location of the heat sink to fill the volume between the shell and tube, adapting the tube for fluid flow, and orients heat pipes inward into the tubes and outward beyond the shell in various arrangements. The heat exchanger is further shown embodied in a system for the removal, transfer, storage and dissipation of thermal energy from a heat source for ground-based and space-based applications.

54 Claims, 4 Drawing Sheets

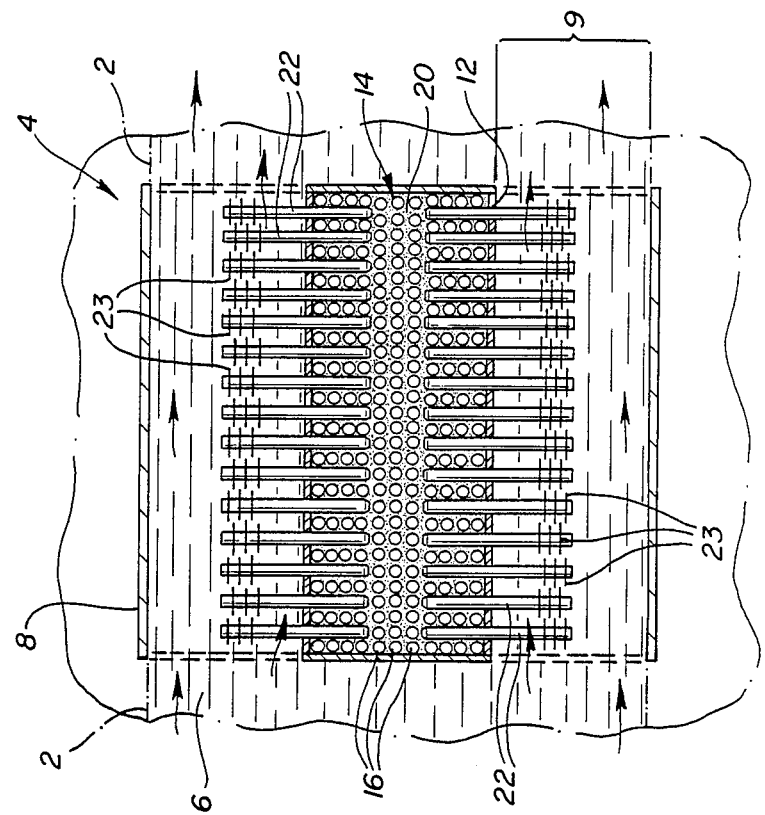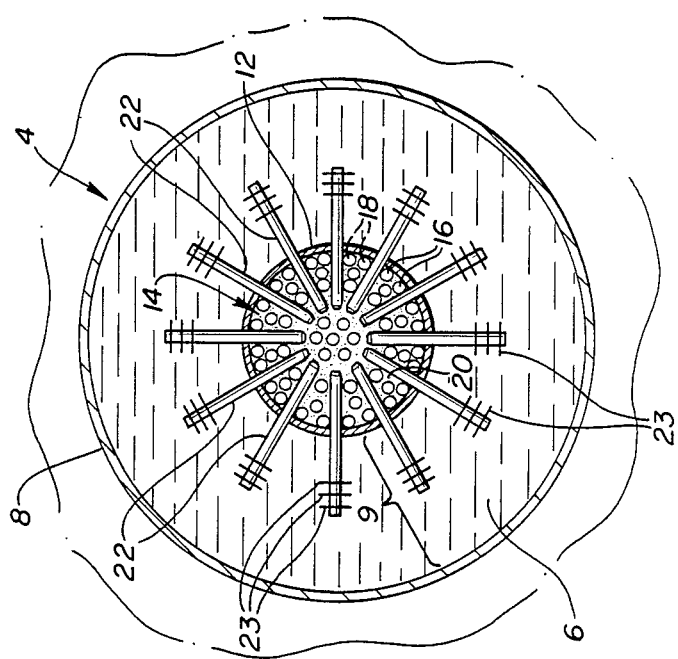

THERMAL ENERGY STORAGE HEAT EXCHANGER

BACKGROUND OF THE INVENTION

This invention relates to heat exchangers used in thermal management systems for systems having thermal management problems. In particular, the invention relates to a modified tube and shell heat exchanger for the transfer, storage, and dissipation of thermal energy generated in high-power, ground-based or space-based power systems applications, such as nuclear power-related devices, and microwave devices.

In the operation of high energy power systems, thermal energy generated during operation must be conveyed away from the source and dissipated. In systems demanding dissipation of high thermal loads, such as generated during a burst power mode, thermal energy may be conveyed from the source, temporarily stored, and later conveyed to an ultimate heat sink, such as the environment or outer space.

To meet such demands it has been proposed to use a phase-change material, such as lithium salts, as a heat sink to remove and temporarily store excess heat generated during burst power modes. Thereafter, the heat may be dissipated from the heat sink over a longer period of time to an ultimate heat sink. Phase-change materials have a high heat of fusion, which enables the storage of significant amounts of thermal energy in such materials as they change phase from solid to liquid phase. They later resolidify as thermal energy is dissipated to an ultimate heat sink. Heat sinks comprising phase-change materials for temporary storage of thermal energy may be located near the heat source or located away from the heat source. The present invention best suited for use in thermal management systems wherein thermal energy storage is located away from the heat source, is also valuable for use in such systems where storage is near the heat source.

While lithium hydride has a high thermal energy storage capacity, it has a very low thermal conductivity. Accordingly, when used in heat sinks, the low thermal conductivity presents an obstacle to the rapid and efficient transfer of heat from the heat source into phase-change materials for storage. In applications where thermal energy is to be stored away from the heat source, systems have been proposed wherein thermal energy is conveyed by a cooling fluid from the heat source to a modified tube and shell heat exchanger for storage. As proposed, the tubes disposed in such modified heat exchangers contain heat sinks in which thermal energy is stored, rather than containing a second cooling fluid into which the energy is exchanged, as in conventional tube and shell heat exchangers. Thus, as adapted for thermal storage systems, the tube and shell design may comprise one or more heat sink tubes which are surrounded by a larger shell. A cooling fluid is circulated in the space defined between the tube and shell. In high power applications the cooling fluid may be sodium. The cooling fluid is typically circulated by one or more pumps through a closed loop circuit of piping from the heat source to the heat exchanger and back.

The short time constraint for removing energy during burst power modes and the poor thermal conductivity of phase change materials have dictated that such modified heat exchangers employ small cylindrical heat sink tubes and high cooling fluid speeds. This puts a particularly serious constraint on using the modified tube and shell heat exchangers for heat storage in space-based systems as larger and more massive systems components such as pumps are required. The need exists, therefore, to find means for enhancing the heat transfer into heat sinks from cooling fluids and provide the rapid and efficient storage of heat into modified tube and shell heat exchangers for space-based, as well as ground-based, applications.

SUMMARY OF THE INVENTION

The present invention meets that need. A plurality of heat pipes are inserted into the heat sink tubes of a modified tube and shell heat exchanger and are extended outward in a generally radial orientation into the flow of cooling fluid between the tube and shell. The insertion of heat pipes into the heat sink permits thermal energy to be conducted into the heat sink through both the surfaces of the heat sink tube and the surfaces of the heat pipes, rather than just from surface of the heat sink tube. Rapid and efficient transfer of thermal energy into the phase-change material of the heat sink is thereby achieved.

The significant improvement in heat transfer from the cooling fluid into the phase-change material of the heat sink in the heat exchanger permits the diameter of the heat sink tubes to be increased and the high velocity of cooling fluid in the annular space to be reduced. As a result, the overall mass of the thermal management system may be reduced, the heat exchanger component may be made more compact. The high driving forces required for the cooling fluid are reduced along with pump size. Moreover, because of the efficiency with which the heat pipes transfer thermal energy into the heat sink, this system makes possible the use of gas as a cooling fluid. Since gas is a much lighter coolant than liquid, the weight of the cooling system, a critical criteria for space applications, is significantly reduced. Thus, it is seen that many problems with thermal conduction which have plagued previous attempts to use tube and shell heat exchanger designs for high power ground-based and, particularly, space-based systems, are eliminated, and various advantages are further provided by the present invention.

The thermal management system of the present invention is designed to convey thermal energy generated during a burst power mode at a heat source to a modified tube and shell heat exchanger as described above. In the heat exchanger, heat pipes rapidly remove thermal energy from the cooling fluid circulating in the space between the tube and shell, and efficiently store the energy in the a heat sink tube. The energy stored in the heat exchanger is thereafter dissipated to an ultimate heat sink during a much longer period of time.

Heat pipes may be used in the manner disclosed for heat exchangers and thermal management applications throughout the entire temperature range at which heat pipes operate. The precise choice of materials and working fluid for the heat pipe will vary with the operating temperatures and thermal loads of each application. As well, the precise choice of materials for the heat pipes, heat sink and other elements may vary. Nonetheless, application-specific deviations may be made without departing from the scope of the present invention wherein the placement of generally radially oriented heat pipes in and through the heat sink solves the problems and provides the advantages described above.

BRIEF DESCRIPTION OF THE DRAWINGS

FIG. 3 is a cross-section of FIG. 2 at line 3—3.

FIG. 4 is a cross-section of FIG. 2 at line 4—4.

DETAILED DESCRIPTION OF THE PREFERRED EMBODIMENT

Figure 1:
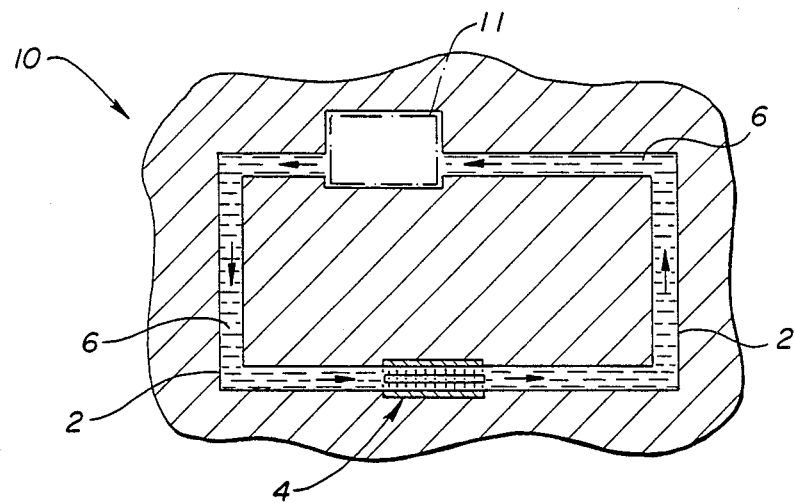
FIG. 1 is a schematic diagram of the thermal management system.
Figure 2:
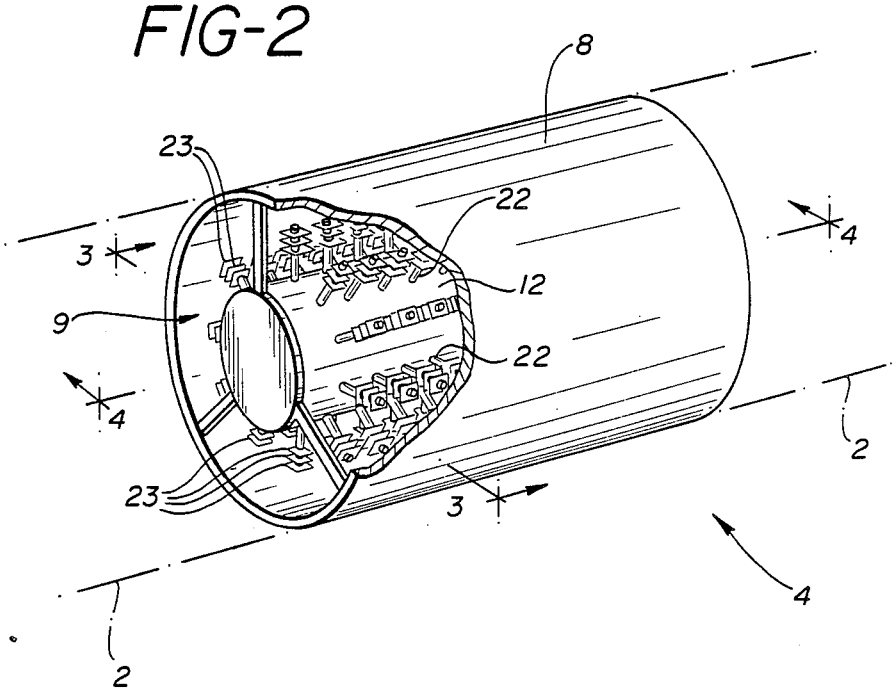
FIG. 2 is a perspective view of the preferred embodiment of the heat exchanger of the thermal energy management system.

Referring to FIG. 1, the thermal energy management system 10 of the present invention is shown in the preferred embodiment for applications having a tube and shell heat exchanger located away from heat source 11. System 10 is a closed loop system comprised of piping 2 and heat exchanger 4 wherein cooling fluid 6 circulates. As seen in FIGS. 2–4, heat exchanger 4 is comprised of an outer shell 8 and inner tube 12 which form annular space 9 wherein cooling fluid 6 circulates. Tube 12 contains heat sink 14. A plurality of heat pipes 22 are oriented radially outward through tube 12 to provide a plurality of paths of low thermal resistance into and through heat sink 14. Heat sink 14 is preferably comprised of containers 16 of phase-change material 18, which may vary in composition with the application. Containers 16 are immersed in a bath of thermally conductive material 20, which provides a means to conduct thermal energy into the containers 16 of phase-change material 18 from the surfaces of tube 12 and heat pipes 22. The outer ends of heat pipes 22 communicate with cooling fluid 6. The outer ends of heat pipes 22 (and alternatively the outer surfaces of container 12) may also include fins 23 such as shown to enhance heat transfer from cooling fluid 6.

Heat pipes 22 have an extremely high thermal conductivity. Their presence in heat sink 14 permits thermal energy (represented by dashed arrows in FIG. 5) to be conducted from cooling fluid 6 into heat sink 14 at an extremely high rate through heat pipes 22 and surfaces of container 12 rather than only being conducted through the surfaces of container 12. Because of the isothermal characteristics of heat pipes 22, the radial temperature drop in tube 12 is significantly reduced, and surfaces of tube 12 exposed to cooling fluid 6 are maintained within acceptable temperature ranges. The various components of the present invention are joined by means known in the art such as press-fitting, and, if necessary, welding and brazing.

In the preferred embodiment of heat exchanger 4 in FIGS. 2–5, tube 12 is comprised of a metal material, preferably stainless steel for high temperature applications, and defines annular space 9 within shell 8. As seen in FIGS. 3 and 4, containers 16 are preferably spherical in shape and are typically comprised of stainless steel or molybdenum. Phase-change material 18 is encapsulated in containers 16. A lithium salt, such as lithium hydride, is a preferred phase-change material for high power applications. Voids and cracks 19 permit the phase-change material to expand when heated without rupturing containers 16. The bath of thermally conductive material 20 is, for high power applications, preferably a sodium potassium bath capable of withstanding high temperatures.

Heat pipes 22 may be micro or, preferably, semi-micro annular heat as are known in the art. Micro heat pipes generally have a diameter of 0.1–10 mm and a length of 10–1,000 mm. Semi-micro annular heat pipes may be defined as having a diameter of 10–100 mm and a length of 10-1,000 mm. The cross sections of heat pipes can be circular, square or other shapes, but the cylindrical semi-micro annular heat pipe, including a core of phase-change material, is preferred.

Figure 5:
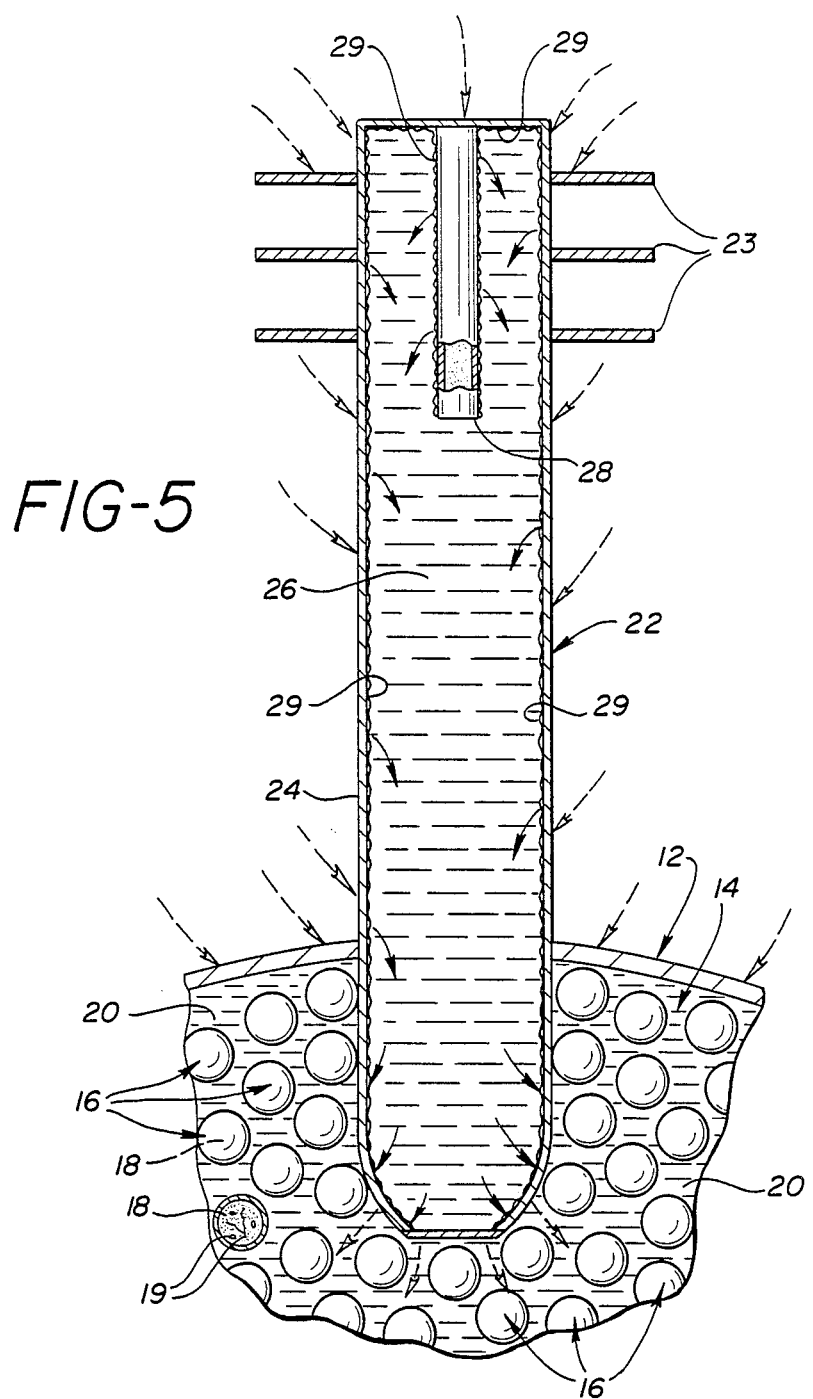
FIG. 5 is a cross-section of the preferred embodiment of the heat exchanger.

As shown in FIG. 5, annular heat pipes are comprised of a tube 24 and working fluid 26. Inner core 28, located at the end of heat pipe 22, is a cylinder of encapsulated Phase-change material disposed generally coaxially inside heat pipe 22 to enhance the performance and thermal conductivity of heat pipe 22. A wick material 29 such as screens, grooves or fiber are typically provided on the inner surfaces of tube 24 and outer surfaces of inner core 28 to provide for return of condensed working fluid 26 by capillary action. Such pipes are discussed by A. Faghri et al in "Heat Pipes for Hands," *Mechanical Engineering* pages 70–74, June 1989, and A. Faghri, 1988, "Performance Characteristics of a Concentric Annular Heat Pipe — Parts I and II, *Proceedings of the National Heat Transfer Conference*, Vol. 1, HTD-Vol. 96, page 386. The phase-change material encapsulated in inner core 28 of heat pipe 22 provides much larger contact area with working fluid 26 than ordinary circular heat transfer pipes, provides additional surface area for wick material, and permits the heat transfer capacity of heat pipe 22 to be nearly doubled. These design features are discussed by T. P. Cotter, "Principles and Prospects of Micro Heat Pipes," *Proc. 5th Annual Int. Heat Pipe Conf.*, pages 328–335, 1984; and M. M. Chen, A. Faghri, "An Analysis of the Vapor Flow and the Heat Conduction through the Liquid Wick and Pipe Wall in a Heat Pipe with Single or Multiple Heat Sources," *Proc.* 1989 *ASME National Heat Transfer Conference*, Philadelphia, Pa., 1989.

Semi-micro annular heat pipes 22 for high power, high temperature applications, preferably employ a lithium salt, such as lithium hydride, in inner core 28, and preferably use sodium as working fluid 26. The action of working fluid 26 in conveying energy down the heat pipe into heat sink 14 is shown by solid arrows in FIG. 5. Even when operating in the range of 800–1600° K., the isothermal characteristics of such heat pipes 22 result in a maximum temperature drop between the opposite ends of heat pipes 22 to be generally on the order of 10° K. The choice of working fluid 26 and material for inner core 28, however, varies with the application, and the precise materials chosen are not critical to the invention disclosed herein which has application throughout the range of temperatures at which heat pipes operate.

A further aspect of the present invention relates to the dissipation of thermal energy from heat sink 14. Dissipation of thermal energy from heat exchanger 4 may be accomplished by extending heat pipes 22 shown in FIGS. 2–4 beyond outer shell 8 to provide radiative cooling to an ultimate heat sink. For ground-based applications, where mass is not critical, dissipation could be enhanced by enclosing outer shell 8 with a larger diameter jacket (not shown), and circulating cooling fluid through the annular space thus formed to a conventional radiator by means known in the art. Alternatively, a more suitable low mass alternative for space-based applications would be to position the inlet and outlet for cooling fluid 6 laterally (not shown) in outer shell 8 rather than at the ends, sealing the ends of outer shell 8, and extending at least one end of inner tube 12 and one end of heat sink 14 through at least one sealed end of outer shell 8. The extended end or ends of inner tube 12 and heat sink 14 could thereby be exposed to an ultimate heat sink to dissipate stored thermal energy by radiation. Additional heat pipes could be included in the extended ends to enhance thermal radiation therefrom.

Thermal energy management systems using modified heat exchangers as disclosed herein also require radiators to reject and dissipate stored heat to an ultimate heat sink 34 later over a period of time. The various heat exchanger arrangements, as described above, may be used to provide such thermal dissipation. As well, dissipation may be accomplished by circulating cooling fluid 6 through system piping, shown in FIG. 1, to remove energy from heat sink 14 by radiation from interconnecting pipes. Without using heat pipes to store and then later dissipate thermal energy, space-based applications require a much longer orbit time after the burst power mode in which to dissipate the thermal energy.

Because of the large ratio of radiation surface area to the mass of heat pipes, heat pipes 22 may also be used for radiators for applications in outer space. Thus, connecting piping between the heat source and heat exchanger may further contain radiation sections comprised of heat pipes, arranged as shown in the alternative embodiments of FIGS. 6 and 7, with or without the heat sink 14 component shown in FIGS. 6 and 7.

Figure 6:
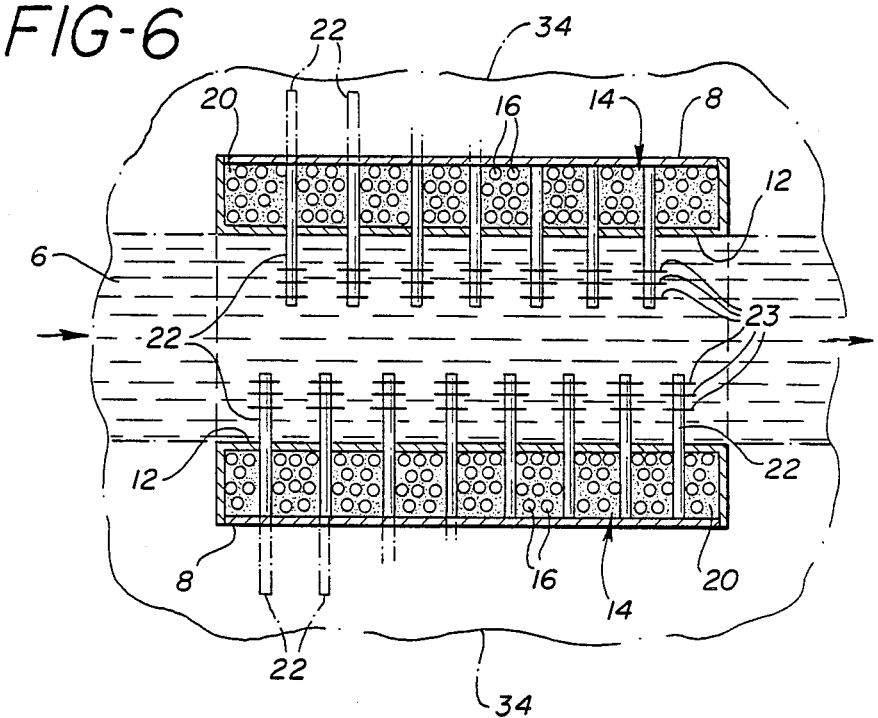
FIG. 6 is a cross-section of an alternative embodiment of the heat exchanger.
Figure 7:
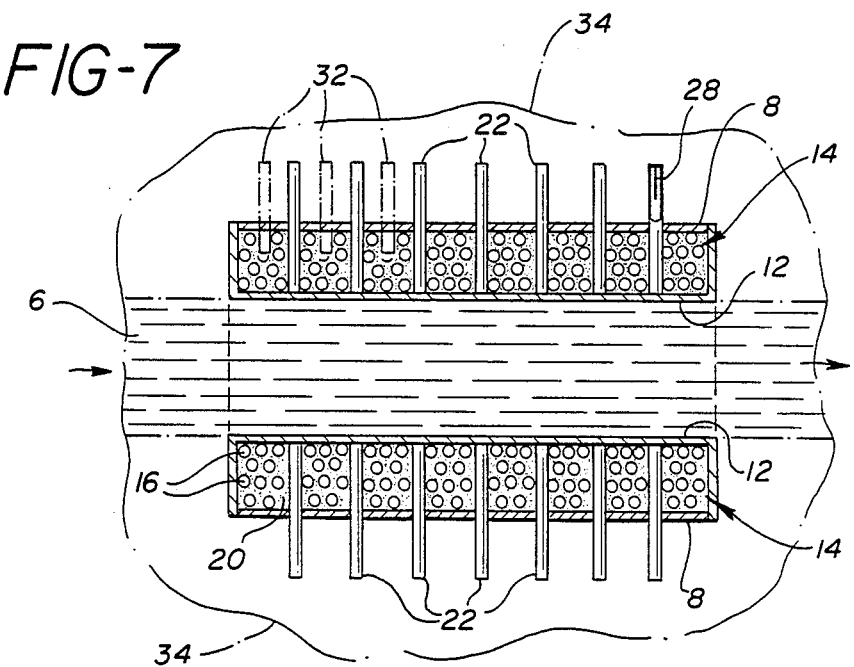
FIG. 7 is a cross-section of a second alternative embodiment of the heat exchanger.

Alternative embodiments of the modified tube and shell heat exchanger are shown in FIGS. 6 and 7. In the alternative embodiment of FIG. 6, the tube and shell arrangement for the heat sink and fluid flow are reversed. In this embodiment, cooling fluid 6 circulates through generally centrally located tube 12 and heat sink 14 is enclosed by shell 8 in annular volume 9. Heat pipes 22 are again extended from the heat sink 14 into the cooling fluid stream, this time, however, inward in a generally radial direction. Rapid and efficient transfer of thermal energy is achieved, as previously described, both through the surface of tube 12 and the surfaces of heat pipes 22. Fins 23, may alternatively be added to heat pipes 22, as shown.

Preferred in the embodiment of FIG. 6 are micro heat pipes or semi-micro annular heat pipes, as described previously, and a heat sink 14 comprised of containers 16 immersed in a thermally conductive bath 20.

Dissipation of thermal energy from heat sink 14 may be achieved in the alternative embodiment of FIG. 6 as previously described. However, preferred for this embodiment is the extension of heat pipes 22 beyond the outer surface of shell 8 (shown in phantom in FIG. 6) into ultimate heat sink 34 such as space, the environment, or other thermal dissipative element (not shown). Alternatively, a plurality of separate heat pipes 32 (as shown in phantom in FIG. 7) could be inserted into the heat sink 14 of FIG. 6 to extend outward into ultimate heat sink 34.

Finally in the second alternative embodiment of FIG. 7, for less critical thermal transfer and storage applications, heat pipes 22 could be extended outward from shell 8 but not inward into cooling fluid 6. So oriented, heat pipes 22 still provide a rapid and efficient means to transfer thermal energy into heat sink 14. Heat pipes 22 may be extended beyond shell 8 into an ultimate heat sink 34, as shown in FIG. 7, to provide for ultimate dissipation of thermal energy. As in the first alternative embodiment, heat pipes 32 may be added extending outward to aid in thermal dissipation.

Any of the alternative embodiments for heat exchanger 4 may be used in a thermal management system as shown in FIG. 1 and described above.

While certain representative embodiments and details have been shown for purposes of illustrating the invention, in particular high power space-based applications, it will be apparent to those skilled in the art that various changes in the thermal energy management system and heat exchanger disclosed herein may be made without departing from the scoPe of the invention, which is defined in the appended claims.

What is claimed is:

1. A heat exchanger comprised of
   a shell having one or more inlets and one or more outlets adapted for cooling fluid flow;
   a tube disposed within said shell defining an annular volume between said tube and said shell, said annular volume adapted for cooling fluid flow;
   a heat sink disposed in said tube; and
   a plurality of heat pipes extending outward from said heat sink into said annular volume,
   said plurality of heat pipes and said tube adapted to exchange thermal energy between said cooling fluid and said heat sink.

2. A heat exchanger as recited in claim 1 wherein said plurality of heat pipes extend outward from said heat sink in a generally radial orientation relative to said heat sink.

3. A heat exchanger as recited in claim 1 wherein said outer shell comprises a cylindrical shell.

4. A heat exchanger as recited in claim 1 wherein said inner shell comprises a cylindrical tube.

5. A heat exchanger as recited in claim 1 wherein said tube and said shell are disposed in generally coaxial orientation.

6. A heat exchanger as recited in claim 1 wherein said heat sink is further comprised of:
   a bath of thermally conductive material, and
   one or more containers containing heat sink material, said one or more containers immersed in said bath of thermally conductive material.

7. A heat exchanger as recited in claim 6 wherein said heat sink material is comprised of a phase-change material.

8. A heat exchanger as recited in claim 7 wherein said phase-change material is ia lithium salt.

9. A heat exchanger as recited in claim 6 wherein said bath of thermally conductive material is comprised of a sodium potassium bath.

10. A heat exchanger as recited in claim 6 wherein said one or more containers are comprised of a metal material.

11. A heat exchanger as recited in claim 6 wherein said one or more containers are spherical in shape.

12. A heat exchanger as recited in claim 1 wherein one or more of said plurality of heat pipes are micro-heat pipes.

13. A heat exchanger as recited in claim 1 wherein one or more of said plurality of heat pipes are semi-micro heat pipes.

14. A heat exchanger as recited in claim 1 wherein one or more of said plurality of heat pipes are annular heat pipes.

15. A heat exchanger as recited in claim 11 wherein said annular heat pipes further comprise an inner core of a heat sink material.

16. A heat exchanger as recited in claim 1 further comprised of one or more fins disposed in said annular volume and attached to one or more of said plurality of heat pipes.

17. A heat exchanger as recited in claim 1 further comprised of means for dissipating thermal energy from said heat sink to an ultimate heat sink.

18. A heat exchanger as recited in claim 17 wherein said means for dissipating is further comprised of:
a radiator; and
means to conduct thermal energy from said heat sink to said radiator.

19. A heat exchanger as recited in claim 17 wherein said means for dissipating is comprised of at least one of said plurality of heat pipes extending through and beyond said shell.

20. A heat exchanger as recited in claim 17 wherein said means for dissipating is comprised of:
a jacket encasing said shell and defining a second volume therebetween;
cooling fluid in said second volume;
means for radiating thermal energy;
means to circulate said cooling fluid to said means for radiating thermal energy.

21. A heat exchanger as recited in claim 17 wherein said means for dissipating is comprised of at least one end of said tube and at least one end of said heat sink extended beyond the end of said shell.

22. A heat exchanger as recited in claim 21 further comprised of at least one heat pipe disposed in at least one end of said tube extended beyond the end of said shell.

23. A heat exchanger as recited in claim 1 wherein said cooling fluid is a gas.

24. A thermal energy management system for removing, transferring, storing and dissipating thermal energy from a heat source comprised of:
a closed loop circuit communicating with a heat source, said closed loop circuit further comprised of piping, one or more pumps, and a heat exchanger;
a cooling fluid in said closed loop circuit circulated by said one or more pumps;
said heat exchanger further comprised of a shell having one or more inlets and one or more outlets, at least one tube disposed within said shell and defining an annular volume therebetween, said annular volume communicating with said closed loop circuit through said one or more inlets and said one or more outlets, a heat sink enclosed in said tube, and a plurality of heat pipes extending outward from said heat sink into said annular volume, said plurality of heat pipes and said tube adapted to exchange thermal energy between said cooling fluid and said heat sink.

25. A thermal energy management system as recited in claim 24 wherein said plurality of heat pipes extend outward from said heat sink in generally radial orientation relative to said heat sink.

26. A thermal energy management system as recited in claim 24 further comprised of one or more fins, disposed in said annular volume and attached to one or more of said plurality of heat pipes.

27. A thermal energy management system as recited in claim 24 further comprised of:
means for dissipating thermal energy from said heat sink to an ultimate heat sink.

28. A thermal energy management system as recited in claim 27 wherein said means for dissipating is further comprised of:
a radiator, and
means to conduct thermal energy from said heat sink to said radiator.

29. A thermal energy management system as recited in claim 24 wherein said cooling fluid is a liquid.

30. A thermal energy management system as recited in claim 24 wherein said cooling fluid is a gas.

31. A heat exchanger comprised of
a shell having one or more inlets and one or more outlets adapted for fluid flow;
a tube disposed within said shell defining an annular volume between said tube and said shell, said annular volume adapted for fluid flow;
a heat sink disposed in said tube, said heat sink further comprising a bath of thermally conductive material and one or more containers of phase-change material, said one or more containers immersed in said bath of thermally conductive material;
a plurality of heat pipes extending in generally radial orientation outward from said heat sink into said annular volume;
said plurality of heat pipes and said tube adapted to exchange thermal energy between fluid flowing through said annular volume and said heat sink.

32. A heat exchanger as recited in claim 31 further comprised of one or more fins disposed in said annular volume and attached to one or more of said plurality of heat pipes.

33. A heat exchanger as recited in claim 31 wherein said heat pipes are semi-micro heat pipes.

34. A heat exchanger as recited in claim 31 wherein said heat pipes are annular heat pipes.

35. A heat exchanger as recited in claim 31 further comprised of means for dissipating thermal energy from said heat sink to an ultimate heat sink.

36. A heat exchanger as recited in claim 35 wherein said means for dissipating is comprised of
a radiator; and
means to conduct thermal energy from said heat sink to said radiator.

37. A heat exchanger comprised of
a shell having one or more inlets and one or more outlets adapted for fluid flow;
one or more tubes disposed within said shell defining a volume between said tube and said shell, said volume adapted for fluid flow;
one or more heat sinks disposed in one or more of said one or more tubes; and
a plurality of heat pipes extending outward from at least one of said one or more heat sinks into said volume;
said plurality of heat pipes and said one or more tubes adapted to exchange thermal energy with a fluid flowing in said volume.

38. A heat exchanger as recited in claim 37 wherein said plurality of heat pipes extend outward from at least one of said one or more heat sinks in a generally radial orientation.

39. A heat exchanger as recited in claim 37 further comprised of one or more fins disposed in said volume and attached to one or more of said plurality of heat pipes.

40. A heat exchanger recited in claim 37 further comprised of:
   means for dissipating thermal energy from said one or more heat sinks to an ultimate heat sink.

41. A heat exchanger comprised of:
   a shell;
   one or more tubes disposed within said shell and defining a volume between said one or more tubes and said shell, at least one of said one or more tubes adapted for fluid flow;
   a heat sink disposed within said volume; and
   a plurality of heat pipes extending inward from said heat sink into at least one of said one or more tubes;
   said plurality of heat pipes and said one or more tubes adapted to exchange thermal energy with a fluid flowing in at least one of said one or more tubes.

42. A heat exchanger as recited in claim 41 wherein said heat sink is comprised of
   a bath of thermally conductive material; and
   one or more containers containing phase-change material immersed in said bath of thermally conductive material.

43. A heat exchanger as recited in claim 41 wherein said plurality of heat pipes extend inward into at least one of said one or more tubes in a generally radial direction.

44. A heat exchanger as recited in claim 41 wherein said plurality of heat pipes are comprised of annular heat pipes.

45. A heat exchanger as recited in claim 41 wherein one or more of said plurality of heat pipes extends outward beyond said shell.

46. A heat exchanger as recited in claim 41 further comprised of one or more fins attached to one or more of said plurality of heat pipes.

47. A heat exchanger as recited in claim 41 further comprising means for dissipating thermal energy from said heat sink to an ultimate heat sink.

48. A heat exchanger as recited in claim 47 wherein said means for dissipating is further comprised of one or more heat pipes extending outward from said heat sink.

49. A heat exchanger comprised of
   a shell;
   one or more tubes disposed within said shell and defining a volume between said one or more tubes and said shell, said one or more tubes adapted for fluid flow;
   a heat sink disposed within said volume; and
   a plurality of heat pipes extending from said one or more tubes outward through said heat sink beyond the outer surface of said shell, said plurality of heat pipes and said one or more tubes adapted to exchange thermal energy between a fluid flow in said one or more tubes and said heat sink.

50. A heat exchanger as recited in claim 49 wherein said plurality of heat pipes extend outward from said one or more tubes in generally radial orientation.

51. A heat exchanger as recited in claim 49 wherein said plurality of heat pipes are micro heat pipes.

52. A heat exchanger as recited in claim 49 wherein said plurality of heat pipes are semi-micro heat pipes.

53. A heat exchanger as recited in claim 49 wherein said plurality of heat pipes are annular heat pipes.

54. A heat exchanger as recited in claim 49 wherein said heat sink is comprised of
   a bath of thermally conductive material; and
   one or more containers of phase-change material, said one or more containers disposed in said bath of thermally conductive material.

* * * * *